United States Patent
Chen et al.

(10) Patent No.: US 11,618,182 B2
(45) Date of Patent: Apr. 4, 2023

(54) METHOD FOR FABRICATION OF 3D PRINTED PART WITH HIGH THROUGH-PLANE THERMAL CONDUCTIVITY

(71) Applicant: Sichuan University, Chengdu (CN)

(72) Inventors: Yinghong Chen, Chengdu (CN); Jingjing Jing, Chengdu (CN); Shaohong Shi, Chengdu (CN); Ning Chen, Chengdu (CN)

(73) Assignee: Sichuan University, Chengdu (CN)

(*) Notice: Subject to any disclaimer, the term of this patent is extended or adjusted under 35 U.S.C. 154(b) by 3 days.

(21) Appl. No.: 17/371,139

(22) Filed: Jul. 9, 2021

(65) Prior Publication Data

US 2023/0009609 A1    Jan. 12, 2023

(51) Int. Cl.
*B29C 64/118*    (2017.01)
*B29B 11/10*    (2006.01)
(Continued)

(52) U.S. Cl.
CPC .............. *B29B 11/10* (2013.01); *B29B 7/905* (2013.01); *B29B 9/14* (2013.01); *B29B 11/16* (2013.01); *B33Y 70/00* (2014.12); *B29C 64/118* (2017.08); *B29K 2023/065* (2013.01); *B29K 2023/0625* (2013.01); *B29K 2023/0633* (2013.01); *B29K 2105/167* (2013.01); *B29K 2507/04* (2013.01);
(Continued)

(58) Field of Classification Search
CPC .......... B29B 11/10; B29B 11/16; B29B 9/14; B29B 7/905; B33Y 10/00; B33Y 70/00; B29K 2995/0013; B29K 2105/167
See application file for complete search history.

(56) References Cited

FOREIGN PATENT DOCUMENTS

| CN | 1130545 A | 9/1996 |
|---|---|---|
| CN | 1066980 C | 6/2001 |

(Continued)

OTHER PUBLICATIONS

English translation of CN-106519390-A (Year: 2016).*
(Continued)

*Primary Examiner* — Timothy Kennedy
*Assistant Examiner* — Farah Taufiq
(74) *Attorney, Agent, or Firm* — Bayramoglu Law Offices LLC (57) ABSTRACT

A method for fabrication of a 3D printed part with high through-plane thermal conductivity is provided, where pure polymer particles and a carbon-based filler for heat conduction are subjected to milling and mixing in the mechano-chemical reactor disclosed in Chinese patent ZL 95111258.9 under the controlled milling conditions including milling pan surface temperature, milling pan pressure, and number of milling cycles; then a resulting mixture is extruded to obtain 3D printing filaments; and finally, the 3D printing filaments are used to fabricate the 3D printed part with high through-plane thermal conductivity through fused deposition modeling (FDM) 3D printing. The fabrication method can realize the fabrication of a 3D printed part with high through-plane thermal conductivity through the FDM 3D printing technology, features simple process, continuous production, etc., and is suitable for the industrial production of thermally-conductive parts with complex structures.

11 Claims, 4 Drawing Sheets

(51) Int. Cl.
*B29B 11/16* (2006.01)
*B29B 9/14* (2006.01)
*B29B 7/90* (2006.01)
*B33Y 70/00* (2020.01)
*B33Y 10/00* (2015.01)
*B29K 23/00* (2006.01)
*B29K 105/16* (2006.01)
*B29K 507/04* (2006.01)

(52) U.S. Cl.
CPC ....... *B29K 2995/0013* (2013.01); *B33Y 10/00* (2014.12)

(56) References Cited

FOREIGN PATENT DOCUMENTS

| CN | 1410475 A | | 4/2003 | |
|---|---|---|---|---|
| CN | 106519390 A | * | 3/2017 | ............... C08K 3/04 |
| CN | 106519390 A | | 3/2017 | |
| CN | 109897177 A | | 6/2019 | |
| CN | 109971140 A | | 7/2019 | |

OTHER PUBLICATIONS

Kanshe Li, Studies on Solid State Shear Compounding Technology by Pan-Milling & Preparation and Properties of Electrical and Thermal Conductive PP/Graphite Nanocomposites, Doctoral Dissertation of Sichuan University, 2002, pp. 1-136.

Yunchao Jia, et al. High through-plane thermal conductivity of polymer based product with vertical alignment of graphite flakes achieved via 3D printing, Composites Science and Technology, 2017, pp. 55-61, 145.

Qingye Li, et al., Mass production of high thermal conductive boron nitride/nanofibrillated cellulose composite membranes, Chemical Engineering Journal, 2019, pp. 1-9.

\* cited by examiner

METHOD FOR FABRICATION OF 3D PRINTED PART WITH HIGH THROUGH-PLANE THERMAL CONDUCTIVITY

TECHNICAL FIELD

The present invention belongs to the technical field of 3D printed parts with high through-plane thermal conductivity, and specifically relates to a method for fabrication of a 3D printed part with high through-plane thermal conductivity, and in particular to the fabrication of printing filaments used for the above-mentioned 3D printed part using a mechano-chemical reactor disclosed in the Chinese patent ZL 95111258.9.

BACKGROUND

With the development of today's modern industry, the microelectronic industry is also growing rapidly. Electronic devices are increasingly made to have higher speed, integration and density, and thus will inevitably produce a lot of heat during operation. Therefore, heat dissipation must be conducted to prevent the electronic devices from overheating. The main purpose of heat dissipation design is to dissipate the heat produced by electronic devices through heat conduction.

A general thermally-conductive material is fabricated by directly melt-compounding a polymer matrix and thermally-conductive functional fillers. Pure polymers suitable for the fabrication of thermally-conductive materials, such as polyethylene (PE), polypropylene (PP), polylactic acid (PLA), polyamide (PA), polyvinyl alcohol (PVA), thermoplastic polyurethane (TPU), acrylonitrile butadiene styrene (ABS) resin, and other materials with excellent processing flowability, typically have no functionality and thermal conductivity. In this regard, it is necessary to introduce multifunctional fillers (such as graphene, carbon nanotubes (CNTs), fullerene, carbon black, graphite, carbon fibers, and boron nitride) to endow the polymer with specific functionality. Due to the low thermal conductivity (0.1 W/mK to 0.5 W/mK) of the polymer matrix, the relatively-large interfacial thermal resistance at filler-polymer matrix interfaces, and the random distribution of the fillers in the matrix, a thermally-conductive material fabricated by the traditional melt-compounding process generally has relatively-low thermal conductivity and through-plane thermal conductivity (0.5 W/mK to 1 W/mK). Consequently, not only is the overall thermal conductivity difficult to meet the development needs of the current electronic industry, but also is the through-plane thermal conductivity performance difficult to meet the requirements for the thermal conductivity of some special functional products (such as the heat dissipation of special devices).

In the prior technologies, thermally-conductive materials with high in-plane thermal conductivity have been successfully developed. For example, a graphene film with an in-plane thermal conductivity as high as 1,940 W/mK, a PVA/boron nitride composite membrane with an in-plane thermal conductivity of 120 W/mK, and a boron nitride material with an in-plane thermal conductivity of 20 W/mK have been successfully developed (Qingye Li, Mass production of high thermal conductive boron nitride/nanofibrillated cellulose composite membranes). However, although the above-mentioned materials have excellent in-plane thermal conductivity, they exhibit a through-plane thermal conductivity generally close to that of a thermally-conductive material fabricated by the traditional melt-compounding process, and thus are difficult to meet the requirements for the practical parts with through-plane thermal conductivity. Additionally, the traditional compression molding technique is not only difficult to fabricate the complex-shape parts with through-plane thermal conductivity, but also has the disadvantage of high cost.

In recent years, 3D printing, also referred to as additive manufacturing, has been used to manufacture parts with various shapes. As one of the most widely used 3D printing techniques, fused deposition modeling (FDM), also known as fused filament fabrication (FFF) is a digital model-based process where a metal or plastic powder is extruded to fabricate filaments for FDM 3D printing, and then a part is modeled by stacking and accumulating a material layer by layer at a time, thereby fabricating complex, fine, and personalized structural products that cannot be fabricated by traditional processing methods. Compared with traditional subtractive manufacturing, the FDM 3D printing technology has significant advantages such as continuous automatic processing, short production cycle, multi-scale and multi-structure products, and high degree of personalized customization. Therefore, the combination of a polymer composite with thermal conductivity and the FDM 3D printing technology suitable for personalized design is expected to achieve the fabrication of polymer-based thermally-conductive parts that are light-weight, low-cost and can meet individual needs, thereby breaking through the restrictions of existing processing technology and conditions. At present, however, the study on the fabrication of polymer-based thermally-conductive heat-dissipating parts by 3D printing and applications thereof in the field of heat conduction remains absent.

In the technical literatures that have been disclosed in the prior technologies, the thermal conductivity of an industrial thermally-conductive material generally needs to reach 1 W/mK, so does the through-plane thermal conductivity thereof. In order to achieve this standard, according to the traditional experience of study, it is necessary to introduce a high content of functional fillers to construct a filler network structure with high thermal conductivity. However, when a polymer composite reaches the industrial standards, the processing flowability of the polymer composite is generally heavily degraded due to the excessively high content of filler, which will cause nozzle clogging during the 3D printing process or even cause a print failure. Even if the 3D printing is achieved by improving the processing flowability of the material, the thermal conductivity of a finally-printed thermally-conductive product still cannot meet the existing standards for thermal conductivity.

In the previously published thesis titled "*Studies on Solid-State Shear Compounding Technology by Pan-Milling & Preparation and Properties of Electrical and Thermal Conductive PP/Graphite Nanocomposites*" (Li Kanshe, Doctoral Dissertation of Sichuan University), the applicant of the present invention disclosed a novel technique for preparation of polymer nanocomposites, solid-state shear milling based on pan-milling, by which flake graphite (FG) and expandable graphite (EP) are subjected to interlayer slipping, exfoliation, and compounding with PP at nanoscale, and then the electrically- and thermally-conductive PP/graphite nanocomposites were successfully prepared. The thermal conductivity of PP/YEP35 composite with 30 wt % of graphite reaches 0.748 W/mK. Completed at an early time (2002), however, the thesis neither conducted further discussions and studies on the interfacial thermal resistance between the functional fillers and the polymer matrix, nor verified whether the prepared composite can be used for the fabrication of filaments suitable for FDM 3D printing. Moreover, as described above, the composite prepared by the solid-state shear milling has a thermal conductivity of only 0.748 W/mK, and under the same condition (the PP/YEP35 composite with 30 wt % of graphite), a composite prepared by the traditional melt-compounding process generally has a thermal conductivity of about 0.643 W/mK, indicating a limited improvement in the thermal conductivity of the former compared to the latter.

Therefore, in the prior technologies, the fabrication of polymer-based thermally-conductive materials that meet the industrial standards is still limited to the compression molding process, which leads to products with single and simple structures, cannot achieve continuous production, has a long production cycle, cannot meet the requirements for personalized customization of products, and cannot endow the product with a complex porous structure to allow heat conduction and ventilation. Furthermore, due to the constraints of the technology itself during the molding process, defects easily appear in the interior of a sheet product, thereby affecting its performance. Primarily, compression molding is fundamentally impossible to obtain a part with high through-plane thermal conductivity, which limits the application range of thermally-conductive parts.

In summary, in order to achieve technological breakthroughs, overcome the shortcomings of existing technologies or materials, and realize the fabrication of polymer-based products with high through-plane thermal conductivity (especially heat-dissipating parts with complex structures) by 3D printing technology, a lot of difficulties and great challenges still need to be overcome. It is the difficulty and focus in the prior technologies to optimize the printability and performance of the material, reduce the interfacial thermal resistance between the fillers and the matrix, and fundamentally solve the contradiction between the high thermal conductivity and the poor 3D printing processability of the material, thereby realizing the fabrication of the personalized polymer-based thermally-conductive parts that can meet thermal conductivity requirements through 3D printing, which urgently needs to be broken through.

SUMMARY

The present invention is intended to solve the above-mentioned problems in the background technologies and provide a method for fabrication of a 3D printed part with high through-plane thermal conductivity. The fabrication method enables the fabrication of a 3D printed part with high through-plane thermal conductivity (5.14 W/mK) through the FDM 3D printing technology. The fabrication method features simple process, continuous production, etc., and is suitable for the industrial production of thermally-conductive parts with complex structures.

In order to achieve the above-mentioned object, the present invention is implemented by adopting a technical solution composed of the following technical measures.

A method for fabrication of a 3D printed part with high through-plane thermal conductivity is provided, including the following steps:

(1) in parts by weight, mixing 100 parts of pure polymer particles with 2 to 40 parts of a carbon-based filler for heat conduction, and milling a resulting mixture in a pan-type milling mechanochemical reactor; and after the milling is completed, collecting a composite powder in which the carbon-based filler is homogeneously dispersed in the polymer matrix; where the pan-type milling mechanochemical reactor has the following process parameters: 20 MPa to 30 MPa of a milling pressure; 30° C. to 40° C. of a milling pan surface temperature controlled by introducing a constant-temperature circulating liquid medium; and 2 to 10 of the number of milling cycles;

(2) extruding the composite powder obtained in step (1) to obtain 3D printing filaments, where the extrusion is conducted under the following process parameters: an extrusion temperature of 10° C. to 50° C. higher than a melting temperature of the pure polymer particles, and extrusion speed: 10 r/min to 50 r/min; and (3) using the 3D printing filaments obtained in step (2) to fabricate the 3D printed part with high through-plane thermal conductivity by FDM 3D printing technology according to a 3D digital model required for the part with high through-plane thermal conductivity, where the FDM 3D printing technology is conducted under the following process parameters: 500 mm/min to 1,500 mm/min of a printing speed, and making the 3D printing filaments be deposited layer by layer along a through-plane thermal conduction direction.

It should be noted that, in order to solve the contradiction between the high thermal conductivity and the poor 3D printing processing flowability of a material in the prior technologies, the present invention improves the compatibility of a filler with a matrix through the unique mechanochemical action of solid-state shear milling, and allows a thermally-conductive functional filler to be exfoliated and homogeneously dispersed in a polymer matrix through the strict control of milling conditions, such that 3D printing filaments in which a filler is homogeneously distributed in a polymer matrix can be fabricated by extrusion. Compared with the traditional simple direct melt-compounding and compression molding process for fabricating a part, the FDM 3D printing technique for fabricating a thermally-conductive part using polymer composite filaments filled with a thermally-conductive filler obtained by pan-milling according to the present invention has the following advantages: 1. The pan milling can realize the exfoliation of a carbon-based filler, such that the filler has prominent dispersibility and compatibility in a matrix, and the fabricated composite filaments have excellent processing flowability and are suitable for FDM 3D printing. 2. Due to a milling action, the interfacial thermal resistance between a polymer matrix and a filler is significantly reduced, which can maximize the high thermal conductivity of the filler. 3. 3D printing conditions are strictly controlled, such that a filler is oriented along a printing direction, which can enable maximum heat conduction and dissipation along a through-plane direction. Therefore, in a thermally-conductive part fabricated by the combination of solid-state shear milling and FDM 3D printing orientation, a carbon-based filler has high compatibility with a polymer, the interfacial thermal resistance is low, and the 3D printed oriented part can allow maximum heat conduction along a filament direction (namely, an in-plane direction of the filler), which enables superior thermal conductivity. Moreover, on the premise of ensuring 3D printing, a loading of a carbon-based filler in a polymer matrix can be greatly increased, such that a finally fabricated 3D printed product has a higher top limit of thermal conductivity.

Compared with the thesis literature previously published by the applicants of the present invention in the background technologies, the present invention further introduces the process parameters of a milling pressure and control of a milling pan surface temperature by introducing a constant-temperature circulating liquid medium based on the solid-state shear milling technology to further reduce the interfacial thermal resistance between a filler and a matrix. The inventors of the present invention have discovered through research that, at room temperature, although heat will be produced on a milling pan surface during milling, a temperature of the milling pan surface is close to room temperature as the heat will be taken away by a mixture material milled, in which case, a final product fabricated by extruding the pan-milled composite powder and then 3D printing has a through-plane thermal conductivity only slightly better than that of a 3D printed product fabricated from filaments obtained by a traditional compounding process; but when a constant-temperature circulating liquid medium is introduced to control of a milling pan surface temperature, especially when the milling pan surface temperature reaches the range of 30° C. to 40° C. claimed by the present invention, a final product fabricated by extruding the pan-milled composite powder and then 3D printing has a significantly-increased through-plane thermal conductivity that far exceeds the through-plane thermal conductivity of a 3D printed product fabricated from filaments obtained based on the milling parameters in the thesis literature previously published, which is due to the significant reduction in the interfacial thermal resistance between a filler and a matrix after milling. When a constant-temperature circulating liquid medium with a temperature 25° C. higher than room temperature is introduced, enough energy can be provided to facilitate the mechanochemical interaction between a polymer matrix and a filler; and when a liquid medium with a temperature 40° C. higher than room temperature is introduced, a polymer will be partially melted due to too-high temperature and frictional heat, which greatly reduces the milling effect and even may cause the milling to fail. Therefore, a final product obtained by extruding a pan-milled composite powder and then 3D printing has a significantly-improved thermal conductivity.

Further, in a 3D printing process of the present invention, an FDM 3D printing speed is controlled to realize the orientation and arrangement of a filler in a matrix, where the printing speed is limited to 500 mm/min to 1,500 mm/min, and under this condition, a thermally-conductive part where the filler is oriented can be fabricated. When the printing speed is lower than the limited speed, the filler is randomly dispersed in the matrix of the printed parts, and it is impossible to fabricate a part with an oriented structure and a high through-plane thermal conductivity; and when the printing speed is higher than the limited speed, the printing of a thermally-conductive part cannot be successfully completed at a slightly-high filler content. After oriented printing is conducted at a limited speed according to a designed digital model, a filler is arranged along a vertical direction of the through-plane test, which can maximize the in-plane thermal conductivity, such that a 3D printed part with high through-plane thermal conductivity can be obtained. It should be noted that because a part fabricated by a traditional process has high in-plane thermal conductivity, it is difficult to obtain a part with high through-plane thermal conductivity, or a high process cost and a complicated process are required, the through-plane thermal conductivity of a 3D printed part is defined and 3D printing filaments are controlled to be deposited layer by layer along a direction perpendicular to a required heat conduction direction. Therefore, through the digital model design of 3D printing and the orientation control of a printing parameter (namely, printing speed), the oriented parts with high thermal conductivity can be fabricated at a large scale. Moreover, the principle of FDM 3D printing is as follows: As fabrication is achieved by depositing 3D printing filaments layer by layer, there is a very obvious heat flow conduction interface among filaments in the stacking and accumulating state, and the interfacial thermal resistance cannot be eliminated in the current FDM printing technology. Therefore, the model design and orientation are used to allow high thermal conductivity at a product interface where filaments are vertically connected (namely, the through-plane thermal conductivity).

In addition, an appropriate milling pressure will also affect the interfacial thermal resistance between a filler and a matrix after milling. In the present invention, the milling pressure is strictly controlled at 20 MPa to 30 MPa, where a milling pressure lower this pressure cannot achieve excellent exfoliation and mechanochemical action, and a milling pressure above this pressure may cause a structure of a filler to be destroyed, thereby affecting the thermal conductivity of a product. The number of milling cycles also needs to be strictly defined (2 to 10). If the number of milling cycles is too small, prominent exfoliation and dispersion effects cannot be achieved; and if the number of milling cycles is too large, a structure of the carbon-based filler may be destroyed due to excessive milling.

Generally, an actual technical operation of the above-mentioned milling cycle is as follows: milling a mixture material in a pan-type milling mechanochemical reactor, collecting a product at a discharge end, and adding the product in the pan-type milling mechanochemical reactor once again for milling, which is regarded as one milling cycle.

Generally, the process parameters of the pan-type milling mechanochemical reactor may also include a milling pan rotation speed. The milling pan rotation speed can be adjusted according to a particle size of the pure polymer particles to increase the milling efficiency. In order to better illustrate the present invention, a technical solution is provided for reference: when the pure polymer particles have an average particle size of about 200 μm, the milling pan rotation speed may be 25 rpm to 35 rpm.

Generally, the pure polymer particles in step (1) may be pure polymer particles of a polymer-based raw material for 3D printing in the prior technologies; preferably, the pure polymer particles may be any one selected from the group consisting of high-density PE, low-density PE, linear low-density PE, PP, PLA, PA 11, PA 12, PVA, TPU, and ABS resin; and more preferably, the pure polymer particles may be high-density PE, low-density PE, linear low-density PE, or PP. It should be noted that some polymer elastomers with a low glass transition temperature, such as ethylene-butene copolymer (SEBS), polyolefin elastomer (POE), ethylene-propylene copolymer (EPDM), and nitrile rubber (NBR) are not suitable for solid-state mechanochemical reaction processing at the temperature.

Generally, the carbon-based filler for heat conduction in step (1) may be a conventional or commercially-available thermally-conductive carbon-based filler in the technologies; preferably, the carbon-based filler for heat conduction may be any one or a combination of two or more from the group consisting of graphene, CNT, carbon black, graphite, fullerene, and carbon fiber; and more preferably, the carbon-based filler for heat conduction may be any one or a combination of two or more from the group consisting of graphene, CNT, carbon black, and graphite.

The pan-type milling mechanochemical reactor in step (1) is the mechanochemical reactor disclosed in the patent ZL 95111258.9 previously authorized by the applicants of the present invention, and a temperature of the milling pan is controlled by introducing a constant-temperature circulating liquid medium into the milling pan. Generally, the liquid medium may be water.

Furthermore, the inventors discover during an implementation process that the filaments used in step (3) can meet the 3D printing conditions; and in order to further improve the mechanical properties of a resulting 3D printed part while ensuring that the through-plane thermal conductivity of the 3D printed part can meet the industrial thermal conductivity standard of 1 W/mK, the selection and addition of a carbon-based filler for heat conduction mainly needs to be limited, and strict milling conditions are also required to allow more uniform dispersion of the filler.

Therefore, in order to better illustrate the present invention and provide a preferred technical solution, the mechanical properties of a final 3D printed part are improved as much as possible on the premise that the thermal conductivity can reach 1 W/mK.

In step (1), 25 to 30 parts of the carbon-based filler for heat conduction may preferably be used, and the carbon-based filler for heat conduction may be any one or a combination of two selected from the group consisting of graphene and CNTs; and more preferably, the carbon-based filler for heat conduction may be graphene, and 30 parts of the graphene may be used; in step (1), the pan-type milling mechanochemical reactor may have the following process parameters: 25 MPa to 30 MPa of a milling pressure, 35° C. to 40° C. of a milling pan surface temperature controlled by introducing a constant-temperature circulating liquid medium, and 5 to 6 of the number of milling cycles; in step (2), the extrusion may be conducted under the following process parameters: an extrusion temperature of 30° C. to 50° C. higher than a melting temperature of the pure polymer particles, and extrusion speed: 30 r/min to 50 r/min; and in step (3), the printing speed may be 800 mm/min to 1,000 mm/min.

It should be noted that, under the above strictly-controlled milling processing conditions, the through-plane thermal conductivity of a final 3D printed product is higher than the industrial thermal conductivity standard, reaching 3.42 W/mK, and under the mechanochemical action of solid-state shear milling, the carbon-based filler exerts an effective reinforcement effect, such that the mechanical properties such as tensile strength (14.11 MPa) and Young's modulus (616.03 MPa) are better than that of a product printed from filaments obtained by the traditional melt-compounding process, and the mechanical strength is improved compared with a pure polymer material; and at the same filler content, the 3D printed thermally-conductive product fabricated by the solid-state shear milling method has better mechanical properties and thermal conductivity than a product fabricated by the traditional process.

Furthermore, the inventors discover during an implementation process that, on the premise of meeting the processing flowability required for FDM 3D printing, a content of the carbon-based filler for heat conduction is further increased, such that a corresponding 3D printed part has a through-plane thermal conductivity of 5.14 W/mK; and at the same filler content, filaments obtained by the traditional direct melt-compounding process cannot be successfully printed to fabricate a thermally-conductive part at a filler weight percentage of 20 to 40 parts.

Therefore, in order to better illustrate the present invention and provide a preferred technical solution, the through-plane thermal conductivity of a final 3D printed part is improved as much as possible on the premise that the 3D printing is allowed.

In step (1), 35 to 40 parts of the carbon-based filler for heat conduction may preferably be used, and the carbon-based filler for heat conduction may be any one or a combination of two selected from the group consisting of graphene and CNTs; and more preferably, the carbon-based filler for heat conduction may be graphene, and 40 parts of the graphene may be used; in step (1), the pan-type milling mechanochemical reactor may have the following process parameters: 27 MPa to 30 MPa of a milling pressure, 38° C. to 40° C. of a milling pan surface temperature controlled by introducing a constant-temperature circulating liquid medium, and 5 to 8 of the number of milling cycles; in step (2), the extrusion may be conducted under the following process parameters: an extrusion temperature of 40° C. to 50° C. higher than a melting temperature of the pure polymer particles, and extrusion speed: 30 r/min to 40 r/min; and in step (3), the printing speed may be 500 mm/min to 800 mm/min.

Under the above-mentioned strictly-controlled milling processing conditions, the through-plane thermal conductivity of a corresponding 3D printed product can reach 5.14 W/mK (a through-plane distance of a sample is 2.5 mm), which is much higher than the requirement for industrial thermal conductivity. The carbon-based filler used, after being mechanochemically compatibilized by solid-state shear milling, exerts an effective reinforcement effect in the matrix, and a corresponding product has a higher tensile strength (11.23 MPa) than a product fabricated by traditional melt-compounding.

It should be noted that those skilled in the technologies can select a more suitable or lower-cost carbon-based filler for heat conduction according to actual needs with reference to the technical solutions provided by the present invention, thereby meeting the needs of industrialization. In order to better illustrate the present invention, the present invention provides the following combined solutions for reference:

Solution 1: in step (1), when the carbon-based filler for heat conduction is the graphene and the polymer particles are high-density PE particles, 30 to 35 parts by weight of the graphene may be used; in step (1), the pan-type milling mechanochemical reactor may have the following process parameters: 25 MPa to 30 MPa of a milling pressure, 35° C. to 40° C. of a milling pan surface temperature controlled by introducing a constant-temperature circulating liquid medium, and 5 to 8 of the number of milling cycles; in step (2), the extrusion may be conducted under the following process parameters: an extrusion temperature of 30° C. to 50° C. higher than a melting temperature of the pure polymer particles, and extrusion speed: 30 r/min to 50 r/min; and in step (3), the printing speed may be 600 mm/min to 900 mm/min.

Solution 2: in step (1), when the carbon-based filler for heat conduction is the CNT and the polymer particles are PE particles, 15 to 25 parts by weight of the CNT may be used; in step (1), the pan-type milling mechanochemical reactor may have the following process parameters: 20 MPa to 30 MPa of a milling pressure, 30° C. to 35° C. of a milling pan surface temperature controlled by introducing a constant-temperature circulating liquid medium, and 5 to 7 of the number of milling cycles; in step (2), the extrusion may be conducted under the following process parameters: an extrusion temperature of 30° C. to 50° C. higher than a melting temperature of the pure polymer particles, and extrusion speed: 35 r/min to 45 r/min; and in step (3), the printing speed may be 800 mm/min to 1,200 mm/min. A thermally-conductive product obtained has high thermal conductivity and mechanical properties.

Generally, in the present invention, in addition to the polymer particles and the carbon-based filler heat conduction, other processing aids such as antioxidants, stabilizers, and plasticizers known in the prior art can also be added. However, these processing aids must not adversely affect the realization of the purpose of the present invention and the achievement of the excellent effect of the present invention.

For the extrusion in step (2), the process conditions are consistent with that of the existing extrusion processing technology except for the extrusion temperature and the extrusion speed defined in the present invention. In the present invention, the process parameters of the pan-type milling mechanochemical reactor, carbon-based filler proportion, and extrusion process are strictly defined to make obtained filaments better suitable for the existing FDM 3D printing technology.

In step (3), the 3D printing filaments are controlled to be deposited layer by layer along a through-plane thermal conduction direction for printing, where a 3D digital model is modeled and designed, and the orientation of the filler is optimized by controlling the printing speed, such that the orientation direction of the printed filler is parallel to a direction along which the through-plane heat flow required for heat conduction flows (the thermally-conductive filler is oriented along a direction parallel to the filaments), which can maximize the in-plane thermal conduction of the filler to achieve the maximum through-plane thermal conductivity.

Generally, in order to more effectively exert the thermal conductivity of a thermally-conductive product obtained by printing in step (3), a thickness of a thermally-conductive part may preferably be at least 2 mm.

The present invention has the following beneficial effects.

1. In the present invention, a carbon-based filler for heat conduction and polymer particles are milled in a special solid-state shear milling device, and a resulting mixture is processed by 3D printing to obtain a thermally-conductive product, which has a higher through-plane thermal conductivity (5.14 W/mK) than a printed thermally-conductive product with the same filler content fabricated by the traditional direct melt-compounding process.

2. The present invention adopts the solid-state shear milling technology to fully mix the carbon-based filler for heat conduction with polymer particles, such that the compatibility between the polymer matrix and the filler and the dispersibility of the carbon-based filler are improved, the interfacial thermal resistance is reduced, and at a high filler content, 3D printing can still be conducted smoothly to obtain a product meeting the industrial thermal conductivity standard. The above process avoids the deterioration of processability of a system added with a filler at a high content, directly solves the technical problem that the existing technology for fabricating a thermally-conductive part cannot achieve both high thermal conductivity and prominent 3D printing processability, and maximizes the mechanical properties of a polymer composite. When the carbon-based filler is added at the same content, the product of the present invention has better mechanical properties such as tensile strength (14.11 MPa) and Young's modulus (616.03 MPa) than that fabricated by the traditional compounding process without milling. When the filaments obtained without milling have a filler content higher than 20 wt %, the 3D printing cannot be conducted smoothly to fabricate a part.

3. The present invention adopts the solid-state shear milling technology to fully mix the carbon-based filler for heat conduction with polymer particles, and further studies the dispersion and exfoliation of the carbon-based filler through 3D printing processing. It is found that, at the same filler content, the filler in a 3D printed part obtained using solid-state shear milling shows better dispersibility than the filler in a printed part fabricated by the traditional direct melt-compounding, which can maximize the effect of the thermally-conductive filler and provide guidance for further solving the dispersion and exfoliation problem of a thermally-conductive nano-filler in the future.

4. In the present invention, a product with high through-plane thermal conductivity is fabricated based on the combination of the solid-state shear milling technology with the FDM printing orientation technology, which has the advantages of simple production process, easy operation, batch continuous production, etc. The present invention is less dependent on the properties of the polymer material itself, can meet the fabrication requirements of most polymer-based thermally-conductive materials, and has obvious advantages in commercial promotion.

DETAILED DESCRIPTION OF THE EMBODIMENTS

Figure 1A:
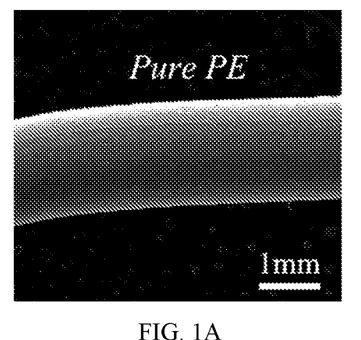
FIGS. 1A-1C show the scanning electron microscopy (SEM) images of a pure PE filament, a graphene (30 wt %)/PE composite filament extruded without milling, and a graphene (30 wt %)/PE composite filament extruded after milling in Example 6, respectively. It can be seen from FIG. 1C that the compatibility of graphene in the PE matrix is improved after solid-state shear milling and the extruded filament has a smooth surface almost without defects and protrusions; and it can be seen from FIG. 1B that the graphene has poor compatibility in the matrix after the traditional simple melt-compounding, resulting in obvious pores and interfaces.
Figure 1B:
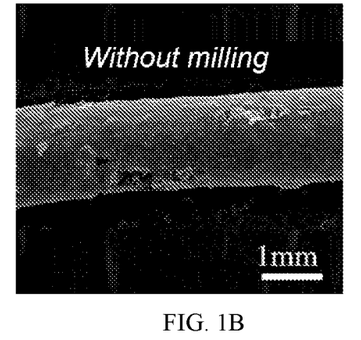
Figure 1C:
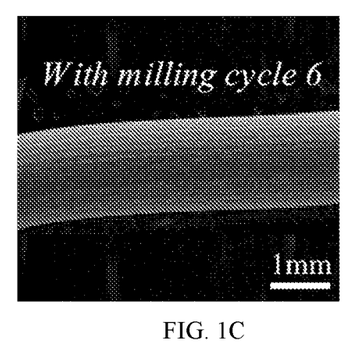
Figure 2A:
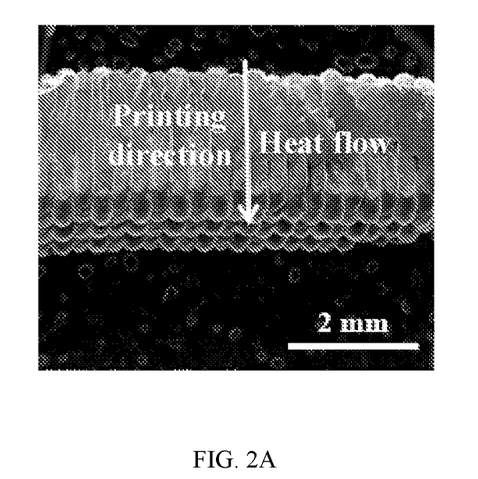
FIGS. 2A-2B show an SEM image of the FDM printed part with high through-plane thermal conductivity designed in Example 1 and a transmission electron microscopy (TEM) image illustrating the orientation and distribution of the graphene filler in the PE matrix along a printing direction, respectively. It can be seen from FIG. 2A that an FDM printed part with a vertical orientation is successfully fabricated; and it can be seen from FIG. 2B that the graphene filler is oriented and arranged in the matrix along the printing direction, which confirms that the heat flow can be conducted and diffused 100% along the orientation direction, indicating high through-plane thermal conductivity.
Figure 2B:
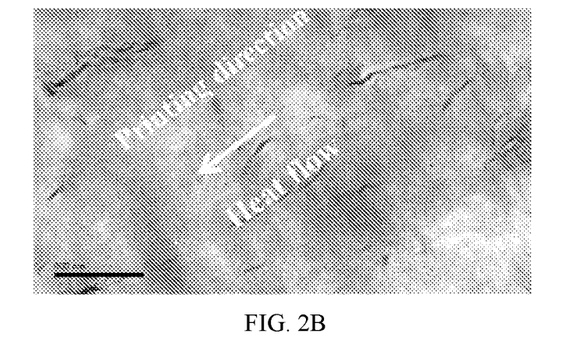
Figure 3A:
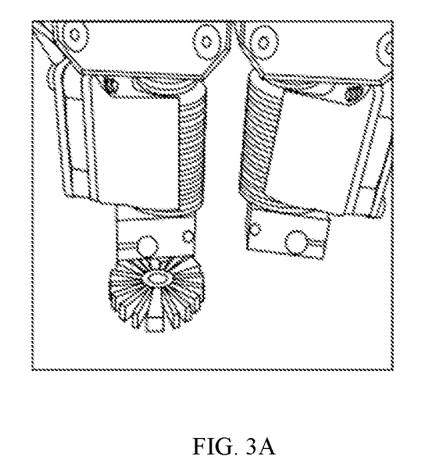
FIGS. 3A-3B show a digital picture demonstrating the FDM 3D printing process and a digital picture demonstrating a thermally-conductive PE part fabricated in Example 1, respectively, where the PE part is fabricated as follows: PE with 30 wt % of graphene is subjected to solid-state mechanochemical milling and then to extrusion to obtain composite filaments suitable for 3D printing, and then the composite filaments are subjected to FDM 3D printing.
Figure 3B:
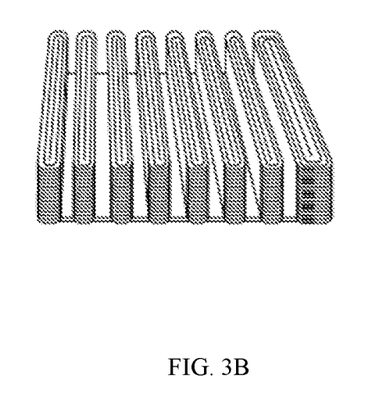
Figure 4:
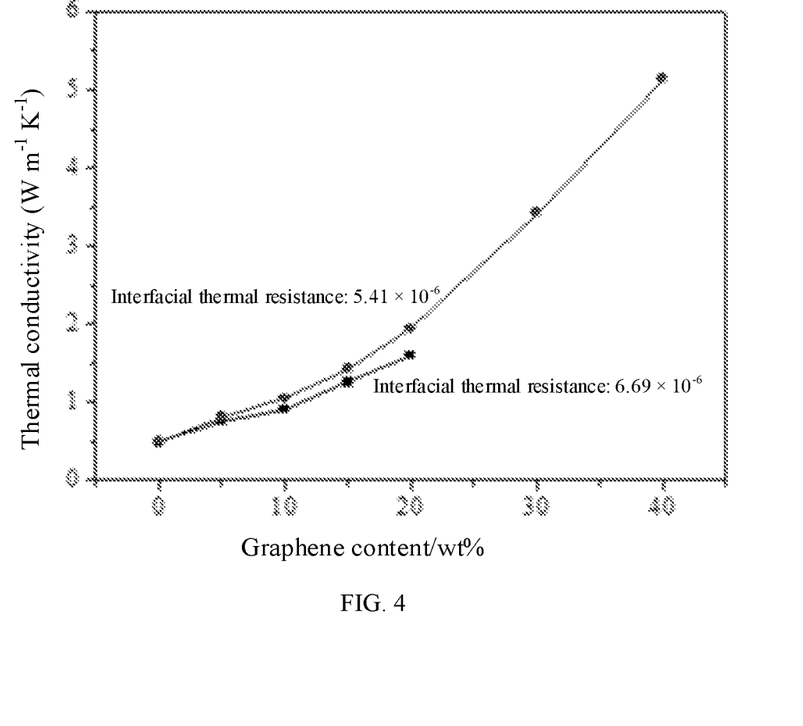
FIG. 4 shows the through-plane thermal conductivity comparison between the thermally-conductive graphene-filled PE product fabricated by the method in Example 1 (including: solid-state shear milling, controlling milling parameters such as pan-milling temperature and milling pressure, and 3D printing orientation technology (upper curve) and the 3D printed product with a corresponding filler content fabricated by the traditional direct melt-compounding method (lower curve). Results show that the product fabricated by new temperature-controlled solid-state shear milling and 3D printing technology has a through-plane thermal conductivity as high as 5.14 W/mK (load: 40 wt %), which fully meets the requirements of general industrial heat-dissipating devices; and the thermally-conductive product fabricated by the traditional direct melt-compounding process has a thermal conductivity of 1.59 W/mK (20 wt %), which is lower than that of the thermally-conductive product fabricated by the present invention at the same filler content. In addition, for the traditional direct melt-compounding process for fabricating filaments, filaments with a graphene content of more than 20 wt % cannot be smoothly printed to fabricate a 3D thermally-conductive product. Therefore, the present invention significantly solves the defect that 3D printed thermally-conductive products with a high filler content cannot be printed in the prior art.

The present invention will be further described below through examples in conjunction with the accompanying drawings. It should be noted that the examples provided should not be construed as limiting the protection scope of the present invention, and some non-essential improvements and adjustments made to the present invention by those skilled in the technologies based on the content of the present invention should still fall within the protection scope of the present invention.

It should be noted that the thermal conductivity is tested by a NETZSCH (LFA467) tester for the examples and comparative examples, and the through-plane thermal conductivity test is adopted as a test method.

EXAMPLE 1

A method for fabrication of a 3D printed part with high through-plane thermal conductivity was provided in this example, including the following steps:

(1) in parts by weight, 100 parts of low-density PE were mixed with 20 parts of a graphene nanosheet, and a resulting mixture was milled in a pan-type milling mechanochemical reactor; and after the milling was completed, a composite powder in which the carbon-based filler was homogeneously dispersed in the polymer matrix was collected; where the pan-type milling mechanochemical reactor had the following process parameters: 30 MPa of a milling pressure; 35° C. of a milling pan surface temperature controlled by introducing a constant-temperature circulating liquid medium; 6 of the number of milling cycles; and 30 r/min of a milling pan rotation speed;

(2) the composite powder obtained in step (1) was extruded to obtain 3D printing filaments, where the extrusion was conducted under the following process parameters: 170° C. of an extrusion temperature, and 30 r/min of an extrusion speed; and (3) the 3D printing filaments obtained in step (2) were used to fabricate the 3D printed part with high through-plane thermal conductivity by the FDM 3D printing technology according to a 3D digital model required for the part with high through-plane thermal conductivity, where the part was a cylindrical sample with a diameter of 25 mm and a thickness of 2 mm, and the FDM 3D printing technology was conducted under the following process parameters: 800 mm/min of a printing speed, and controlling the 3D printing filaments to be deposited layer by layer along a through-plane thermal conduction direction for printing.

As tested, a final part obtained in Example 1 showed a through-plane thermal conductivity of 1.94 W/mK and a tensile strength of 13.38 MPa.

Comparative Example 1

A method for fabricating a 3D printed part with specified through-plane thermal conductivity by the traditional direct melt-compounding process was provided in this comparative example, including the following steps:

(1) 100 parts of low-density PE and 20 parts of a graphene nanosheet were directly mixed to obtain a composite powder;

(2) the composite powder obtained in step (1) was extruded to obtain 3D printing filaments, where the extrusion was conducted under the following process parameters: 170° C. of an extrusion temperature, and 30 r/min of an extrusion speed;

(3) the 3D printing filaments obtained in step (2) were used to fabricate the 3D printed part with specified through-plane thermal conductivity by the FDM 3D printing technology according to a 3D digital model required for the part with specified through-plane thermal conductivity, where the part was a cylindrical sample with a diameter of 25 mm and a thickness of 2 mm, and the FDM 3D printing technology was conducted under the following process parameters: 800 mm/min of a printing speed, and controlling the 3D printing filaments to be deposited layer by layer along a through-plane thermal conduction direction for printing.

As tested, a final part obtained in Comparative Example 1 showed a a through-plane thermal conductivity of 1.59 W/mK and a tensile strength of 9.12 MPa.

EXAMPLE 2

A method for fabrication of a 3D printed part with high through-plane thermal conductivity was provided in this example, including the following steps:

(1) in parts by weight, 100 parts of low-density PE were mixed with 20 parts of CNT, and a resulting mixture was milled in a pan-type milling mechanochemical reactor; and after the milling was completed, a composite powder in which the carbon-based filler was homogeneously dispersed in the polymer matrix was collected; where the pan-type milling mechanochemical reactor had the following process parameters: 25 MPa of a milling pressure; 35° C. of a milling pan surface temperature controlled by introducing a constant-temperature circulating liquid medium; 6 of the number of milling cycles; and 30 r/min of a milling pan rotation speed;

(2) the composite powder obtained in step (1) was extruded to obtain 3D printing filaments, where the extrusion was conducted under the following process parameters: 170° C. of an extrusion temperature, and 30 r/min of an extrusion speed; and (3) the 3D printing filaments obtained in step (2) were used to fabricate the 3D printed part with specified through-plane thermal conductivity by the FDM 3D printing technology according to a 3D digital model required for the part with specified through-plane thermal conductivity, where the part was a cylindrical sample with a diameter of 25 mm and a thickness of 2 mm, and the FDM 3D printing technology was conducted under the following process parameters: 800 mm/min of a printing speed, and controlling the 3D printing filaments to be deposited layer by layer along a through-plane thermal conduction direction for printing.

As tested, a final part obtained in Example 2 had a through-plane thermal conductivity of 1.68 W/mK and a tensile strength of 14.01 MPa.

Comparative Example 2

A method for fabricating a 3D printed part with specified through-plane thermal conductivity by the traditional direct melt-compounding process was provided in this comparative example, including the following steps:

(1) 100 parts of low-density PE and 20 parts of a graphene nanosheet were directly mixed to obtain a composite powder;

(2) the composite powder obtained in step (1) was extruded to obtain 3D printing filaments, where the extrusion was conducted under the following process parameters: 170° C. of an extrusion temperature, and 30 r/min of an extrusion speed; and (3) the 3D printing filaments obtained in step (2) were used to fabricate the 3D printed part with specified through-plane thermal conductivity by the FDM 3D printing technology according to a 3D digital model required for the part with specified through-plane thermal conductivity, where the part was a cylindrical sample with a diameter of 25 mm and a thickness of 2 mm, and the FDM 3D printing technology was conducted under the following process parameters: 800 mm/min of a printing speed, and controlling the 3D printing filaments to be deposited layer by layer along a through-plane thermal conduction direction for printing.

As tested, a final part obtained in Comparative Example 2 showed a through-plane thermal conductivity of 1.13 W/mK and a tensile strength of 10.51 MPa.

EXAMPLE 3

A method for fabrication of a 3D printed part with high through-plane thermal conductivity was provided in this example, including the following steps:

(1) in parts by weight, 100 parts of low-density PE were mixed with 40 parts of a graphene nanosheet, and a resulting mixture was milled in a pan-type milling mechanochemical reactor; and after the milling was completed, a composite powder in which the carbon-based filler was homogeneously dispersed in the polymer matrix was collected; where the pan-type milling mechanochemical reactor had the following process parameters: 30 MPa of a milling pressure; 40° C. of a milling pan surface temperature controlled by introducing a constant-temperature circulating liquid medium; 6 of the number of milling cycles; and 30 r/min of a milling pan rotation speed;

(2) the composite powder obtained in step (1) was extruded to obtain 3D printing filaments, where the extrusion was conducted under the following process parameters: 170° C. of an extrusion temperature, and 30 r/min of an extrusion speed; and (3) the 3D printing filaments obtained in step (2) were used to fabricate the 3D printed part with high through-plane thermal conductivity by the FDM 3D printing technology according to a 3D digital model required for the part with high through-plane thermal conductivity, where the part was a cylindrical sample with a diameter of 25 mm and a thickness of 2 mm, and the FDM 3D printing technology was conducted under the following process parameters: 600 mm/min of a printing speed, and controlling the 3D printing filaments to be deposited layer by layer along a through-plane thermal conduction direction for printing.

As tested, a final part obtained in Example 3 showed a through-plane thermal conductivity of 5.14 W/mK and a tensile strength of 11.23 MPa.

EXAMPLE 4

A method for fabrication of a 3D printed part with high through-plane thermal conductivity was provided in this example, including the following steps:

(1) in parts by weight, 100 parts of PP were mixed with 40 parts of a graphene nanosheet, and a resulting mixture was milled in a pan-type milling mechanochemical reactor; and after the milling was completed, a composite powder in which the carbon-based filler was homogeneously dispersed in the polymer matrix was collected; where the pan-type milling mechanochemical reactor had the following process parameters: 30 MPa of a milling pressure; 40° C. of a milling pan surface temperature controlled by introducing a constant-temperature circulating liquid medium; 8 of the number of milling cycles; and 30 r/min of a milling pan rotation speed;

(2) the composite powder obtained in step (1) was extruded to obtain 3D printing filaments, where the extrusion was conducted under the following process parameters: 200° C. of an extrusion temperature, and 30 r/min of an extrusion speed; and (3) the 3D printing filaments obtained in step (2) were used to fabricate the 3D printed part with high through-plane thermal conductivity by the FDM 3D printing technology according to a 3D digital model required for the part with high through-plane thermal conductivity, where the part was a cylindrical sample with a diameter of 25 mm and a thickness of 2 mm, and the FDM 3D printing technology was conducted under the following process parameters: 700 mm/min of a printing speed, and controlling the 3D printing filaments to be deposited layer by layer along a through-plane thermal conduction direction for printing.

As tested, a final part obtained in Example 4 showed a through-plane thermal conductivity of 4.84 W/mK and a tensile strength of 25.73 MPa.

EXAMPLE 5

A method for fabrication of a 3D printed part with high through-plane thermal conductivity was provided in this example, including the following steps:

(1) in parts by weight, 100 parts of an ABS resin were mixed with 35 parts of CNT, and a resulting mixture was milled in a pan-type milling mechanochemical reactor; and after the milling was completed, a composite powder in which the carbon-based filler was homogeneously dispersed in the polymer matrix was collected; where the pan-type milling mechanochemical reactor had the following process parameters: 25 MPa of a milling pressure; 35° C. of a milling pan surface temperature controlled by introducing a constant-temperature circulating liquid medium; 8 of the number of milling cycles; and 30 r/min of a milling pan rotation speed;

(2) the composite powder obtained in step (1) was extruded to obtain 3D printing filaments, where the extrusion was conducted under the following process parameters: 200° C. of an extrusion temperature, and 30 r/min of an extrusion speed; and (3) the 3D printing filaments obtained in step (2) were used to fabricate the 3D printed part with high through-plane thermal conductivity by the FDM 3D printing technology according to a 3D digital model required for the part with high through-plane thermal conductivity, where the part was a cylindrical sample with a diameter of 25 mm and a thickness of 2 mm, and the FDM 3D printing technology was conducted under the following process parameters: 700 mm/min of a printing speed, and controlling the 3D printing filaments to be deposited layer by layer along a through-plane thermal conduction direction for printing.

As tested, a final part obtained in Example 5 showed a through-plane thermal conductivity of 3.98 W/mK and a tensile strength of 18.23 MPa.

EXAMPLE 6

A method for fabrication of a 3D printed part with high through-plane thermal conductivity was provided in this example, including the following steps:

(1) in parts by weight, 100 parts of PVA particles were mixed with 30 parts of a graphene nanosheet, and a resulting mixture was milled in a pan-type milling mechanochemical reactor; and after the milling was completed, a composite powder in which the carbon-based filler was homogeneously dispersed in the polymer matrix was collected; where the pan-type milling mechanochemical reactor had the following process parameters: 25 MPa of a milling pressure; 35° C. of a milling pan surface temperature controlled by introducing a constant-temperature circulating liquid medium; 6 of the number of milling cycles; and 30 r/min of a milling pan rotation speed;

(2) the composite powder obtained in step (1) was extruded to obtain 3D printing filaments, where the extrusion was conducted under the following process parameters: 190° C. of an extrusion temperature, and 20 r/min of an extrusion speed; and (3) the 3D printing filaments obtained in step (2) were used to fabricate the 3D printed part with high through-plane thermal conductivity by the FDM 3D printing technology according to a 3D digital model required for the part with high through-plane thermal conductivity, where the part was a cylindrical sample with a diameter of 25 mm and a thickness of 2 mm, and the FDM 3D printing technology was conducted under the following process parameters: 700 mm/min of a printing speed, and controlling the 3D printing filaments to be deposited layer by layer along a through-plane thermal conduction direction for printing.

As tested, a final part obtained in Example 6 showed a through-plane thermal conductivity of 3.25 W/mK and a tensile strength of 17.23 MPa.

EXAMPLE 7

A method for fabrication of a 3D printed part with high through-plane thermal conductivity was provided in this example, including the following steps:

(1) in parts by weight, 100 parts of PA 11 particles were mixed with 40 parts of a graphene nanosheet, and a resulting mixture was milled in a pan-type milling mechanochemical reactor; and after the milling was completed, a composite powder in which the carbon-based filler was homogeneously dispersed in the polymer matrix was collected; where the pan-type milling mechanochemical reactor had the following process parameters: 25 MPa of a milling pressure; 35° C. of a milling pan surface temperature controlled by introducing a constant-temperature circulating liquid medium; 5 of the number of milling cycles; and 25 r/min of a milling pan rotation speed;

(2) the composite powder obtained in step (1) was extruded to obtain 3D printing filaments, where the extrusion was conducted under the following process parameters: 210° C. of an extrusion temperature, and 30 r/min of an extrusion speed; and (3) the 3D printing filaments obtained in step (2) were used to fabricate the 3D printed part with high through-plane thermal conductivity by the FDM 3D printing technology according to a 3D digital model required for the part with high through-plane thermal conductivity, where the part was a cylindrical sample with a diameter of 25 mm and a thickness of 2 mm, and the FDM 3D printing technology was conducted under the following process parameters: 800 mm/min of a printing speed, and controlling the 3D printing filaments to be deposited layer by layer along a through-plane thermal conduction direction for printing.

As tested, a final part obtained in Example 7 showed a through-plane thermal conductivity of 3.64 W/mK and a tensile strength of 20.05 MPa.

What is claimed is:

1. A method for a fabrication of a 3D printed part with a high through-plane thermal conductivity, comprising the following steps:
   (1) mixing 100 parts by weight of pure polymer particles with 2 to 40 parts by weight of a carbon-based filler for a heat conduction to obtain a resulting mixture, and milling the resulting mixture in a pan-type milling mechanochemical reactor; and after the resulting mixture is milled, collecting a composite powder, wherein in the composite powder, the carbon-based filler is homogeneously dispersed in a polymer matrix; wherein the pan-type milling mechanochemical reactor has the following process parameters: 20 MPa to 30 MPa of a milling pressure; 30° C. to 40° C. of a milling pan surface temperature controlled by introducing the constant-temperature circulating liquid medium; and 2 to 10 of a number of milling cycles;
   the pure polymer particles are one selected from the group consisting of high-density polyethylene (PE) particles, low-density PE particles, and linear low-density PE particles; and
   the carbon-based filler for the heat conduction is one or a combination of two selected from the group consisting of graphene and carbon nanotubes (CNTs);
   (2) performing an extrusion on the composite powder obtained in step (1) to obtain 3D printing filaments, wherein the extrusion is conducted under the following process parameters:
   an extrusion temperature of 10° C. to 50° C. higher than a melting temperature of the pure polymer particles, and 10 r/min to 50 r/min of an extrusion speed; and
   (3) using the 3D printing filaments obtained in step (2) to fabricate the 3D printed part with the high through-plane thermal conductivity through a fused deposition modeling (FDM) 3D printing technology according to a 3D digital model required for the 3D printed part with the high through-plane thermal conductivity, wherein the FDM 3D printing technology is conducted under the following process parameters: 500 mm/min to 1,500 mm/min of a printing speed, and controlling the 3D printing filaments to be deposited layer by layer along a through-plane thermal conduction direction.

2. The method according to claim 1, wherein
in step (1), the pan-type milling mechanochemical reactor further has the following process parameter: 25 rpm to 35 rpm of a milling pan rotation speed.

3. The method according to claim 1, wherein
in step (1), 25 to 30 parts by weight of the carbon-based filler for the heat conduction are used, and the carbon-based filler for the heat conduction is one or a combination of two selected from the group consisting of the graphene and the CNTs;
in step (1), the pan-type milling mechanochemical reactor has the following process parameters: 25 MPa to 30 MPa of the milling pressure, 35° C. to 40° C. of the milling pan surface temperature controlled by introducing the constant-temperature circulating liquid medium, and 5 to 6 of the number of milling cycles;

in step (2), the extrusion is conducted under the following process parameters: the extrusion temperature of 30° C. to 50° C. higher than the melting temperature of the pure polymer particles, and 30 r/min to 50 r/min of the extrusion speed; and in step (3), the printing speed is 800 mm/min to 1,000 mm/min.

4. The method according to claim 1, wherein in step (1), 35 to 40 parts by weight of the carbon-based filler for the heat conduction are used, and the carbon-based filler for the heat conduction is one or a combination of two selected from the group consisting of the graphene and the CNTs;

in step (1), the pan-type milling mechanochemical reactor has the following process parameters: 27 MPa to 30 MPa of the milling pressure, 38° C. to 40° C. of the milling pan surface temperature controlled by introducing the constant-temperature circulating liquid medium, and 5 to 8 of the number of milling cycles;

in step (2), the extrusion is conducted under the following process parameters: the extrusion temperature of 40° C. to 50° C. higher than the melting temperature of the pure polymer particles, and 30 r/min to 40 r/min of the extrusion speed; and in step (3), the printing speed is 500 mm/min to 800 mm/min.

5. The method according to claim 1, wherein in step (1), when the carbon-based filler for the heat conduction is the graphene and the polymer particles are the high-density PE particles, 30 to 35 parts by weight of the graphene are used;

in step (1), the pan-type milling mechanochemical reactor has the following process parameters: 25 MPa to 30 MPa of the milling pressure, 35° C. to 40° C. of the milling pan surface temperature controlled by introducing the constant-temperature circulating liquid medium, and 5 to 8 of the number of milling cycles;

in step (2), the extrusion is conducted under the following process parameters: the extrusion temperature of 30° C. to 50° C. higher than the melting temperature of the pure polymer particles, and 30 r/min to 50 r/min of the extrusion speed; and in step (3), the printing speed is 600 mm/min to 900 mm/min.

6. The method according to claim 1, wherein in step (1), when the carbon-based filler for the heat conduction is the CNTs and the polymer particles are the PE particles, 15 to 25 parts by weight of the CNTs are used;

in step (1), the pan-type milling mechanochemical reactor has the following process parameters: 20 MPa to 30 MPa of the milling pressure, 30° C. to 35° C. of the milling pan surface temperature controlled by introducing the constant-temperature circulating liquid medium, and 5 to 7 of the number of milling cycles;

in step (2), the extrusion is conducted under the following process parameters: the extrusion temperature of 30° C. to 50° C. higher than the melting temperature of the pure polymer particles, and 35 r/min to 45 r/min of the extrusion speed; and in step (3), the printing speed is 800 mm/min to 1,200 mm/min.

7. A 3D printed part with a high through-plane thermal conductivity fabricated by the method according to claim 1.

8. A 3D printed part with a high through-plane thermal conductivity fabricated by the method according to claim 3.

9. The 3D printed part according to claim 8, wherein in step (1), 35 to 40 parts by weight of the carbon-based filler for the heat conduction are used, and the carbon-based filler for the heat conduction is one or a combination of two selected from the group consisting of the graphene and the CNTs;

in step (1), the pan-type milling mechanochemical reactor has the following process parameters: 27 MPa to 30 MPa of the milling pressure, 38° C. to 40° C. of the milling pan surface temperature controlled by introducing the constant-temperature circulating liquid medium, and 5 to 8 of the number of milling cycles;

in step (2), the extrusion is conducted under the following process parameters: the extrusion temperature of 40° C. to 50° C. higher than the melting temperature of the pure polymer particles, and 30 r/min to 40 r/min of the extrusion speed; and in step (3), the printing speed is 500 mm/min to 800 mm/min.

10. The 3D printed part according to claim 8, wherein in step (1), when the carbon-based filler for the heat conduction is the graphene and the polymer particles are the high-density PE particles, 30 to 35 parts by weight of the graphene are used;

in step (1), the pan-type milling mechanochemical reactor has the following process parameters: 25 MPa to 30 MPa of the milling pressure, 35° C. to 40° C. of the milling pan surface temperature controlled by introducing the constant-temperature circulating liquid medium, and 5 to 8 of the number of milling cycles;

in step (2), the extrusion is conducted under the following process parameters: the extrusion temperature of 30° C. to 50° C. higher than the melting temperature of the pure polymer particles, and 30 r/min to 50 r/min of the extrusion speed; and in step (3), the printing speed is 600 mm/min to 900 mm/min.

11. The 3D printed part according to claim 8, wherein in step (1), when the carbon-based filler for the heat conduction is the CNTs and the polymer particles are the PE particles, 15 to 25 parts by weight of the CNTs are used;

in step (1), the pan-type milling mechanochemical reactor has the following process parameters: 20 MPa to 30 MPa of the milling pressure, 30° C. to 35° C. of the milling pan surface temperature controlled by introducing the constant-temperature circulating liquid medium, and 5 to 7 of the number of milling cycles;

in step (2), the extrusion is conducted under the following process parameters: the extrusion temperature of 30° C. to 50° C. higher than the melting temperature of the pure polymer particles, and 35 r/min to 45 r/min of the extrusion speed; and in step (3), the printing speed is 800 mm/min to 1,200 mm/min.

* * * * *